United States Patent
Zhou

(10) Patent No.: US 11,756,437 B2
(45) Date of Patent: Sep. 12, 2023

(54) METHOD, SYSTEM, AND USER TERMINAL FOR FLIGHT ROUTE SPLICING

(71) Applicant: AUTEL ROBOTICS CO., LTD., Guangdong (CN)

(72) Inventor: Dongguang Zhou, Guangdong (CN)

(73) Assignee: AUTEL ROBOTICS CO., LTD., Guangdong (CN)

(*) Notice: Subject to any disclaimer, the term of this patent is extended or adjusted under 35 U.S.C. 154(b) by 92 days.

(21) Appl. No.: 17/451,868

(22) Filed: Oct. 22, 2021

(65) Prior Publication Data

US 2022/0044577 A1 Feb. 10, 2022

Related U.S. Application Data

(63) Continuation of application No. PCT/CN2020/086123, filed on Apr. 22, 2020.

(30) Foreign Application Priority Data

Apr. 24, 2019 (CN) .......................... 201910335388.3

(51) Int. Cl.
*G08G 5/00* (2006.01)
*B64C 39/02* (2023.01)
*G01C 21/20* (2006.01)

(52) U.S. Cl.
CPC ......... *G08G 5/0069* (2013.01); *B64C 39/024* (2013.01); *G01C 21/20* (2013.01); *G08G 5/0047* (2013.01); *B64U 2201/00* (2023.01)

(58) Field of Classification Search
CPC .. G08G 5/0069; G08G 5/0047; G08G 5/0034; G08G 5/0039; G08G 5/0086;
(Continued)

(56) References Cited

U.S. PATENT DOCUMENTS 6,377,875 B1 4/2002 Schwaerzler
6,735,630 B1 * 5/2004 Gelvin ................... B60R 25/33
709/200
(Continued)

FOREIGN PATENT DOCUMENTS

CN 106054920 A 10/2016
CN 106845032 A 6/2017
(Continued)

OTHER PUBLICATIONS

Ji-Sheng Jiang, et al.; "Application of UAV aerial system in Mine Surveying", Mapping technology, 2 pages; 2018.
(Continued)

*Primary Examiner* — Richard M Camby

(57) ABSTRACT

Method, system, and user terminal are disclosed for splicing a flight route splicing m. Various embodiments may includes: obtaining a first flight route and a second flight route of an unmanned aerial vehicle; extracting a flight height of a highest waypoint having a greatest flight height in the first flight route and the second flight route and ground elevations of a series of waypoints between a termination waypoint of the first flight route and a start waypoint of the second flight route; obtaining a flight height of an intermediate flight route; determining the intermediate flight route; and splicing the first flight route and the second flight route according to the intermediate flight route to generate a spliced flight route.

27 Claims, 7 Drawing Sheets

(58) Field of Classification Search
CPC .. B64C 39/024; G01C 21/20; B64U 2201/00; B64U 2101/00
See application file for complete search history.

(56) References Cited

U.S. PATENT DOCUMENTS

| | | | |
|---|---|---|---|
| 7,020,701 B1 * | 3/2006 | Gelvin | H04L 67/12 709/224 |
| 2004/0193334 A1 | 9/2004 | Carlsson et al. | |
| 2010/0148940 A1 * | 6/2010 | Gelvin | H01Q 9/0464 340/286.02 |

FOREIGN PATENT DOCUMENTS

| | | |
|---|---|---|
| CN | 107209519 A | 9/2017 |
| CN | 107544548 A | 1/2018 |
| CN | 108351652 A | 7/2018 |
| CN | 108496132 A | 9/2018 |
| CN | 108594850 A | 9/2018 |
| CN | 109035869 A | 12/2018 |
| CN | 110118557 A | 8/2019 |

OTHER PUBLICATIONS

The International Search Report dated Jul. 22, 2020; PCT/CN2020/086123.

* cited by examiner

METHOD, SYSTEM, AND USER TERMINAL FOR FLIGHT ROUTE SPLICING

BACKGROUND

This application is a continuation of national application No. PCT/CN2020/086123, filed on Apr. 22, 2020, which claims priority to Chinese Patent Application No. 201910335388.3, filed on Apr. 24, 2019, which is incorporated herein by reference in its entirety.

TECHNICAL FIELD

This application relates to the field of unmanned aerial vehicles, and in particular, to a method, system, and user terminal for flight route splicing.

Unmanned aerial vehicles are a type of unmanned aircrafts mainly controlled by radio remote control or programs therein. With the development of unmanned aerial vehicle technologies, unmanned aerial vehicles are used more and more widely, and are often used in plant protection, urban management, geology, meteorology, electric power, emergency rescue and disaster relief, video capture, and other scenes.

At present, a flight route for an unmanned aerial vehicle is always planned to be a single flight route, for example, the unmanned aerial vehicle can only fly or perform tasks at a plurality of waypoints on the flight route in turn, and can only follow the current flight route at a time. Because there is currently no method for splicing two flight routes to plan a general flight route, an unmanned aerial vehicle cannot perform tasks on a plurality of flight routes at a time, and can only first return to a designated place after completing a current task, and then perform other flight tasks, which causes a waste of unmanned aerial vehicle resources and time, and affects the task execution efficiency of the unmanned aerial vehicle.

SUMMARY

The technical problem to be resolved by the present invention is that a flight route for an unmanned aerial vehicle in the prior art is always planned to be a single flight route, and the unmanned aerial vehicle cannot follow two or more flight routes, resulting in a waste of unmanned aerial vehicle resources and time and affecting the task execution efficiency of the unmanned aerial vehicle. Therefore, a flight route splicing method, system, and user terminal are provided.

An embodiment of the present invention provides a flight route splicing method, including: obtaining a first flight route and a second flight route of an unmanned aerial vehicle; obtaining a flight height of a highest waypoint having a greatest flight height in the first flight route and the second flight route, and ground elevations of a series of waypoints between a termination waypoint of the first flight route and a start waypoint of the second flight route; obtaining a flight height of an intermediate flight route according to the flight height of the highest waypoint and the ground elevations of the series of waypoints between the termination waypoint and the start waypoint, where the intermediate flight route is used for connecting the first flight route and the second flight route and is located between the first flight route and the second flight route; determining the intermediate flight route according to first geographic location information of the termination waypoint, second geographic location information of the start waypoint, and the flight height of the intermediate flight route; and splicing the first flight route and the second flight route according to the intermediate flight route to generate a spliced flight route.

Optionally, obtaining a flight height of an intermediate flight route according to the flight height of the highest waypoint and the ground elevations of the series of waypoints between the termination waypoint and the start waypoint includes: judging whether the flight height of the highest waypoint is greater than the ground elevations of the series of waypoints between the termination waypoint and the start waypoint; and determining the flight height of the highest waypoint as the flight height of the intermediate flight route when the flight height of the highest waypoint is greater than the ground elevations of the series of waypoints between the termination waypoint and the start waypoint.

Optionally, the flight route splicing method further includes: obtaining a highest ground elevation among the ground elevations of the series of waypoints between the termination waypoint and the start waypoint when the flight height of the highest waypoint is not greater than the ground elevations of the series of waypoints between the termination waypoint and the start waypoint; obtaining a ground elevation of the highest waypoint; and determining a sum of a difference between the highest ground elevation and the ground elevation of the highest waypoint and a preset threshold as a flight height of the intermediate flight route.

Optionally, the ground elevation of the highest waypoint is a difference between an elevation height of the highest waypoint and the flight height of the highest waypoint.

Optionally, determining the intermediate flight route according to first geographic location information of the termination waypoint, second geographic location information of the start waypoint, and the flight height of the intermediate flight route includes: determining a start waypoint of the intermediate flight route, where geographic location information of the start waypoint of the intermediate flight route is the same as the first geographic location information; determining a termination waypoint of the intermediate flight route, where geographic location information of the termination waypoint of the intermediate flight route is the same as the second geographic location information; and generating the intermediate flight route according to the start waypoint of the intermediate flight route, the termination waypoint of the intermediate flight route, and the flight height of the intermediate flight route.

Optionally, the first geographic location information includes latitude and longitude information of the termination waypoint and the second geographic location information includes latitude and longitude information of the start waypoint.

Optionally, the flight route splicing method further includes: displaying the spliced flight route to a user.

Optionally, the flight route splicing method further includes: calculating estimated flight durations of the first flight route and the second flight route, separately; determining whether a sum of the estimated flight durations of the first flight route and the second flight route is greater than a preset flight duration of the unmanned aerial vehicle; and sending, to the user, prompt information that a flight distance or flight duration of the unmanned aerial vehicle is excessively long and the user needs to confirm whether to continue splicing when the sum of the estimated flight durations of the first flight route and the second flight route is greater than the preset flight duration of the unmanned aerial vehicle.

Optionally, the flight route splicing method further includes: calculating a shortest flight duration for the unmanned aerial vehicle to fly from the termination waypoint of the first flight route to the start waypoint of the second flight route at a maximum flight speed when the sum of the estimated flight durations of the first flight route and the second flight route is not greater than the preset flight duration of the unmanned aerial vehicle; judging whether a sum of the sum of estimated flight durations of the first flight route and the second flight route and the shortest flight duration is greater than the preset flight duration of the unmanned aerial vehicle; and sending, to the user, prompt information that the flight distance of the unmanned aerial vehicle is excessively long and the user needs to confirm whether to continue splicing when the sum of the sum of estimated flight durations of the first flight route and the second flight route and the shortest flight duration is greater than the preset flight duration of the unmanned aerial vehicle.

An embodiment of the present invention further provides a flight route splicing system, including: a flight route obtaining module, configured to obtain a first flight route and a second flight route of an unmanned aerial vehicle; a waypoint information extracting module, configured to obtain a flight height of a highest waypoint having a greatest flight height in the first flight route and the second flight route and ground elevations of a series of waypoints between a termination waypoint of the first flight route and a start waypoint of the second flight route; an elevation information obtaining module, configured to obtain a flight height of an intermediate flight route according to the flight height of the highest waypoint and the ground elevations of the series of waypoints between the termination waypoint and the start waypoint, where the intermediate flight route is used for connecting the first flight route and the second flight route and is located between the first flight route and the second flight route; an intermediate flight route determining module, configured to determine the intermediate flight route according to first geographic location information of the termination waypoint, second geographic location information of the start waypoint, and the flight height of the intermediate flight route; and a spliced flight route generating module, configured to splice the first flight route and the second flight route according to the intermediate flight route to generate a spliced flight route.

Optionally, the waypoint information extracting module includes: a judging sub-module, configured to judge whether the flight height of the highest waypoint is greater than the ground elevations of the series of waypoints between the termination waypoint and the start waypoint; and a first determining sub-module, configured to determine the flight height of the highest waypoint as the flight height of the intermediate flight route when the flight height of the highest waypoint is greater than the ground elevations of the series of waypoints between the termination waypoint and the start waypoint.

Optionally, the waypoint information extracting module further includes: a first obtaining sub-module, configured to obtain a highest ground elevation among the ground elevations of the series of waypoints between the termination waypoint and the start waypoint when the flight height of the highest waypoint is not greater than the ground elevations of the series of waypoints between the termination waypoint and the start waypoint; a second obtaining sub-module, configured to obtain a ground elevation of the highest waypoint; and a second determining sub-module, configured to determine a sum of a difference between the highest ground elevation and the ground elevation of the highest waypoint and a preset threshold as the flight height of the intermediate flight route.

Optionally, the ground elevation of the highest waypoint is a difference between an elevation of the highest waypoint and the flight height of the highest waypoint.

Optionally, the intermediate flight route determining module includes: a start waypoint determining sub-module, configured to determine a start waypoint of the intermediate flight route, where geographic location information of the start waypoint of the intermediate flight route is the same as the first geographic location information; a termination waypoint determining sub-module, configured to determine a termination waypoint of the intermediate flight route, where geographic location information of the termination waypoint of the intermediate flight route is the same as the second geographic location information; and an intermediate flight route generating sub-module, configured to generate the intermediate flight route according to the start waypoint of the intermediate flight route, the termination waypoint of the intermediate flight route, and the flight height of the intermediate flight route.

Optionally, the first geographic location information includes latitude and longitude information of the termination waypoint and the second geographic location information includes latitude and longitude information of the start waypoint.

Optionally, the flight route splicing system further includes: a display module, configured to display the spliced flight route to a user.

Optionally, the flight route splicing system further includes: an estimated flight duration calculating module, configured to calculate estimated flight durations of the first flight route and the second flight route, separately; a first judging module, configured to judge whether a sum of the estimated flight durations of the first flight route and the second flight route is greater than a preset flight duration of the unmanned aerial vehicle; and a first prompt information sending module, configured to send, to the user, prompt information that the flight distance or the flight duration of the unmanned aerial vehicle is excessively long and the user needs to confirm whether to continue splicing when the sum of the sum of estimated flight durations of the first flight route and the second flight route and the shortest flight duration is greater than the preset flight duration of the unmanned aerial vehicle.

Optionally, the flight route splicing system further includes: a shortest flight duration calculating module, configured to calculate a shortest flight duration for the unmanned aerial vehicle to fly from the termination waypoint of the first flight route to the start waypoint of the second flight route at a maximum flight speed when the sum of the estimated flight durations of the first flight route and the second flight route is not greater than the preset flight duration of the unmanned aerial vehicle; a second judging module, configured to judge whether a sum of the sum of estimated flight durations of the first flight route and the second flight route and the shortest flight duration is greater than the preset flight duration of the unmanned aerial vehicle; and a second prompt information sending module, configured to send, to the user, prompt information that a flight distance of the unmanned aerial vehicle is excessively long and the user needs to confirm whether to continue splicing when the sum of the sum of the estimated flight durations of the first flight route and the second flight route and the shortest flight duration is greater than the preset flight duration of the unmanned aerial vehicle.

An embodiment of the present invention further provides a non-transient computer-readable storage medium, where the non-transient computer-readable storage medium stores computer instructions, and the computer instructions, when executed by a processor, cause the computer to implement the above-mentioned flight route splicing method.

An embodiment of the present invention further provides a computer device, including: at least one processor; and a memory in communication connection with the at least one processor, where the memory stores instructions capable of being executed by the at least one processor, and the instructions, when executed by the at least one processor, cause the at least one processor to perform the above-mentioned flight route splicing method.

An embodiment of the present invention further provides a user terminal, in communication connection with an unmanned aerial vehicle, and including a body, a display screen disposed in the body, and a controller disposed in the body, where the controller is configured to: obtain a first flight route and a second flight route of an unmanned aerial vehicle; obtain a flight height of a highest waypoint having a greatest flight height in the first flight route and the second flight route and ground elevations of a series of waypoints between a termination waypoint of the first flight route and a start waypoint of the second flight route; obtain a flight height of an intermediate flight route according to the flight height of the highest waypoint and the ground elevations of the series of waypoints between the termination waypoint and the start waypoint, where the intermediate flight route is used for connecting the first flight route and the second flight route and is located between the first flight route and the second flight route; determine the intermediate flight route according to first geographic location information of the termination waypoint, second geographic location information of the start waypoint, and the flight height of the intermediate flight route; and splice the first flight route and the second flight route according to the intermediate flight route to generate a spliced flight route.

Optionally, the controller being specifically configured to obtain a flight height of an intermediate flight route according to the flight height of the highest waypoint and the ground elevations of the series of waypoints between the termination waypoint and the start waypoint includes: judging whether the flight height of the highest waypoint is greater than the ground elevations of the series of waypoints between the termination waypoint and the start waypoint; and determining the flight height of the highest waypoint as the flight height of the intermediate flight route when the flight height of the highest waypoint is greater than the ground elevations of the series of waypoints between the termination waypoint and the start waypoint.

Optionally, the controller is further configured to: obtain a highest ground elevation among the ground elevations of the series of waypoints between the termination waypoint and the start waypoint when the flight height of the highest waypoint is not greater than the ground elevations of the series of waypoints between the termination waypoint and the start waypoint; obtain a ground elevation of the highest waypoint; and determine a sum of a difference between the highest ground elevation and the ground elevation of the highest waypoint and a preset threshold as the flight height of the intermediate flight route.

Optionally, the ground elevation of the highest waypoint is a difference between an elevation of the highest waypoint and the flight height of the highest waypoint.

Optionally, the controller being specifically configured to determine the intermediate flight route according to first geographic location information of the termination waypoint, second geographic location information of the start waypoint, and the flight height of the intermediate flight route includes: determining a start waypoint of the intermediate flight route, where geographic location information of the start waypoint of the intermediate flight route is the same as the first geographic location information; determining a termination waypoint of the intermediate flight route, where geographic location information of the termination waypoint of the intermediate flight route is the same as the second geographic location information; and generating the intermediate flight route according to the start waypoint of the intermediate flight route, the termination waypoint of the intermediate flight route, and the flight height of the intermediate flight route.

Optionally, the first geographic location information includes latitude and longitude information of the termination waypoint and the second geographic location information includes latitude and longitude information of the start waypoint.

Optionally, the controller is configured to control the display screen to display the spliced flight route to a user.

Optionally, the controller is further configured to: calculate estimated flight durations of the first flight route and the second flight route, separately; determine whether a sum of the estimated flight durations of the first flight route and the second flight route is greater than a preset flight duration of the unmanned aerial vehicle; send, through the display screen to the user, prompt information that a flight distance or flight duration of the unmanned aerial vehicle is excessively long and the user needs to confirm whether to continue splicing when the sum of the estimated flight durations of the first flight route and the second flight route is greater than the preset flight duration of the unmanned aerial vehicle.

Optionally, the controller is further configured to: calculate a shortest flight duration for the unmanned aerial vehicle to fly from the termination waypoint of the first flight route to the start waypoint of the second flight route at a maximum flight speed when the sum of the estimated flight durations of the first flight route and the second flight route is not greater than the preset flight duration of the unmanned aerial vehicle; judge whether a sum of the sum of the estimated flight durations of the first flight route and the second flight route and the shortest flight duration is greater than the preset flight duration of the unmanned aerial vehicle; and send, through the display screen to the user, prompt information that the flight distance of the unmanned aerial vehicle is excessively long and the user needs to confirm whether to continue splicing when the sum of the sum of the estimated flight durations of the first flight route and the second flight route and the shortest flight duration is greater than the preset flight duration of the unmanned aerial vehicle.

The technical solutions of the present invention have the following advantages.

An embodiment of the present invention provides a flight route splicing method. In the flight route splicing method, by obtaining two different flight routes, separately obtaining a flight height of a highest waypoint having a greatest flight height in the first flight route and the second flight route and ground elevations of a series of waypoints between a termination waypoint of the first flight route and a start waypoint of the second flight route, then obtaining a flight height of an intermediate flight route according to the described information, determining the intermediate flight route according to first geographic location information of the termination waypoint, second geographic location information of the start waypoint, and the flight height of the intermediate flight route, and splicing the first flight route and the second flight route according to the intermediate flight route to generate a spliced flight route, the unmanned aerial vehicle can fly to the second flight route according to the spliced flight route after executing the first flight route to execute tasks on the second flight route, so that the unmanned aerial vehicle can execute a plurality of flight routes at a time, thereby improving the task execution efficiency of the unmanned aerial vehicle and saving the unmanned aerial vehicle resources and time, and further providing richer choices for users and providing more space for customized flight route planning for users.

An embodiment of the present invention further provides a user terminal, in communication connection with an unmanned aerial vehicle, and including a body, a display screen disposed in the body, and a controller disposed in the body, where the controller is configured to obtain two different flight routes, separately obtain a flight height of a highest waypoint having a greatest flight height in the first flight route and the second flight route and ground elevations of a series of waypoints between a termination waypoint of the first flight route and a start waypoint of the second flight route, then obtain a flight height of an intermediate flight route according to the described information, determine the intermediate flight route according to first geographic location information of the termination waypoint, second geographic location information of the start waypoint, and the flight height of the intermediate flight route, and splice the first flight route and the second flight route according to the intermediate flight route to generate a spliced flight route, so that the unmanned aerial vehicle can fly to the second flight route according to the spliced flight route after executing the first flight route to execute tasks on the second flight route, and the unmanned aerial vehicle can execute a plurality of flight routes at a time, thereby improving the task execution efficiency of the unmanned aerial vehicle and saving the unmanned aerial vehicle resources and time, and further providing richer choices for users and providing more space for customized flight route planning for users.

BRIEF DESCRIPTION OF THE ACCOMPANYING DRAWINGS

To explain the technical solutions in the Detailed Description of the present invention or in the prior art more clearly, the drawings needed in the Detailed Description or the prior art will be briefly described below. Apparently, the drawings in the following description are some embodiments of the present invention, and other drawings can be derived from these drawings without creative effort for those of ordinary skill in the art.

DETAILED DESCRIPTION OF THE EMBODIMENTS

A clear and complete description of the technical solutions of the present invention will be given below in combination with the accompanying drawings. Apparently, the described embodiments are some rather than all of the embodiments of the present invention. Based on the embodiments in the present invention, all other embodiments obtained by those of ordinary skill in the art without making creative efforts shall fall within the scope of protection of the present invention.

In the description of the present invention, it should be noted that the terms "first", "second", "third", and the like are used only for description and cannot be understood to indicate or imply relative importance.

In addition, the technical features involved in the different embodiments of the present invention described below may be combined with each other as long as they do not conflict with each other.

Figure 1:
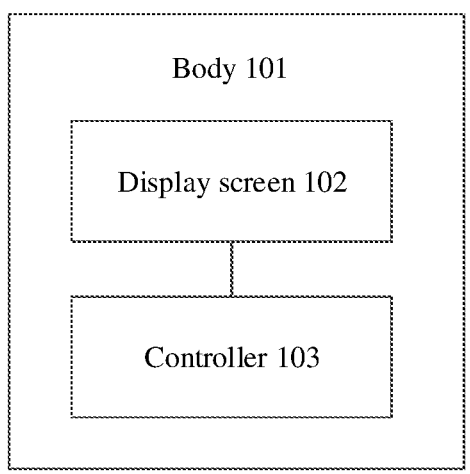
FIG. 1 is a schematic structural block diagram of a user terminal according to an embodiment of the present invention.

An embodiment of the present invention provides a flight route-based splicing method, which is applied to a user terminal. The user terminal is wirelessly connected to an unmanned aerial vehicle. As shown in FIG. 1, the user terminal includes: a body 101, a display screen 102 disposed in the body 101, and a controller 103 disposed in the body 101. The controller 103 in the user terminal is configured to execute the flight route-based splicing method. It should be noted that this embodiment of the present invention takes the application of the flight route splicing method to the user terminal as an example. In practical application, the flight route splicing method may alternatively be executed by a flight control chip of an unmanned aerial vehicle, and the present invention is not limited thereto.

Figure 2:
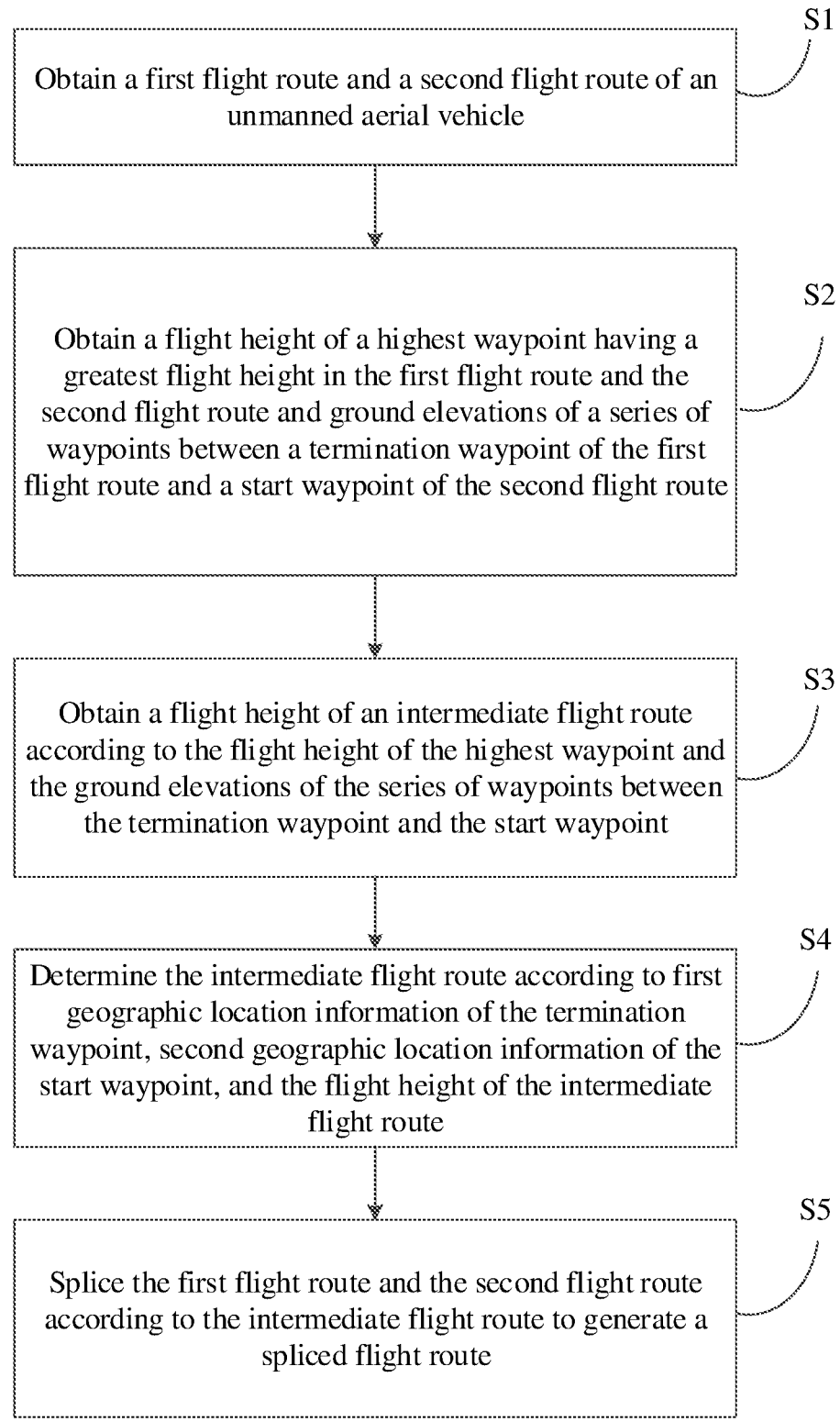
FIG. 2 is a flowchart of a flight route splicing method according to an embodiment of the present invention.

As shown in FIG. 2, the specific steps of the flight route splicing method include the following.

In step S1, a first flight route and a second flight route of an unmanned aerial vehicle are obtained. In an embodiment of the present invention, specifically, the first flight route may be a flight route that the unmanned aerial vehicle is currently executing, and the second flight route is a next flight route to be executed by the unmanned aerial vehicle. In other possible embodiments, the first flight route and the second flight route may alternatively be flight routes that the unmanned aerial vehicle plans to execute.

In step S2, a flight height of a highest waypoint having a greater flight height in the first flight route and the second flight route and ground elevations of a series of waypoints between a termination waypoint of the first flight route and a start waypoint of the second flight route are obtained.

The flight height of the highest waypoint having the greatest flight height may be directly obtained from the planning and design of the first flight route and the second flight route. In practical application, there is usually a distance between the first flight route and the second flight route executed by the unmanned aerial vehicle, and the unmanned aerial vehicle needs to pass through a series of waypoints that do not pertain to the first flight route and the second flight route to fly from the termination waypoint of the first flight route to the start waypoint of the second flight route. The series of waypoints may be selected at regular intervals between the termination waypoint of the first flight route and the start waypoint of the second flight route. For example, a series of waypoints may be arranged between the first flight route and the second flight route in a preset distance interval according to geographical locations went through by the first flight route and the second flight route. For example, a preset waypoint is set every one meter or ten meters. In practical application, the interval can be set according to requirements, for example, the preset waypoint setting interval can be increased in a large flight range, and the preset waypoint setting interval can be reduced in a small range. The present invention is not limited thereto. The ground elevation of a waypoint in the present invention refers to a height obtained by subtracting the elevation of the waypoint by a flight height of the unmanned aerial vehicle at the waypoint.

In step S3, a flight height of an intermediate flight route is obtained according to the flight height of the highest waypoint and the ground elevations of the series of waypoints between the termination waypoint and the start waypoint. The intermediate flight route refers to a flight route used for connecting the first flight route and the second flight route and located between the first flight route and the second flight route.

Specifically, in an embodiment of the present invention, the geographic information between the termination waypoint and the start waypoint can be obtained from an existing GPS map or another positioning system to obtain the ground elevations of the series of waypoints between the start waypoint and the termination waypoint.

Figure 3:
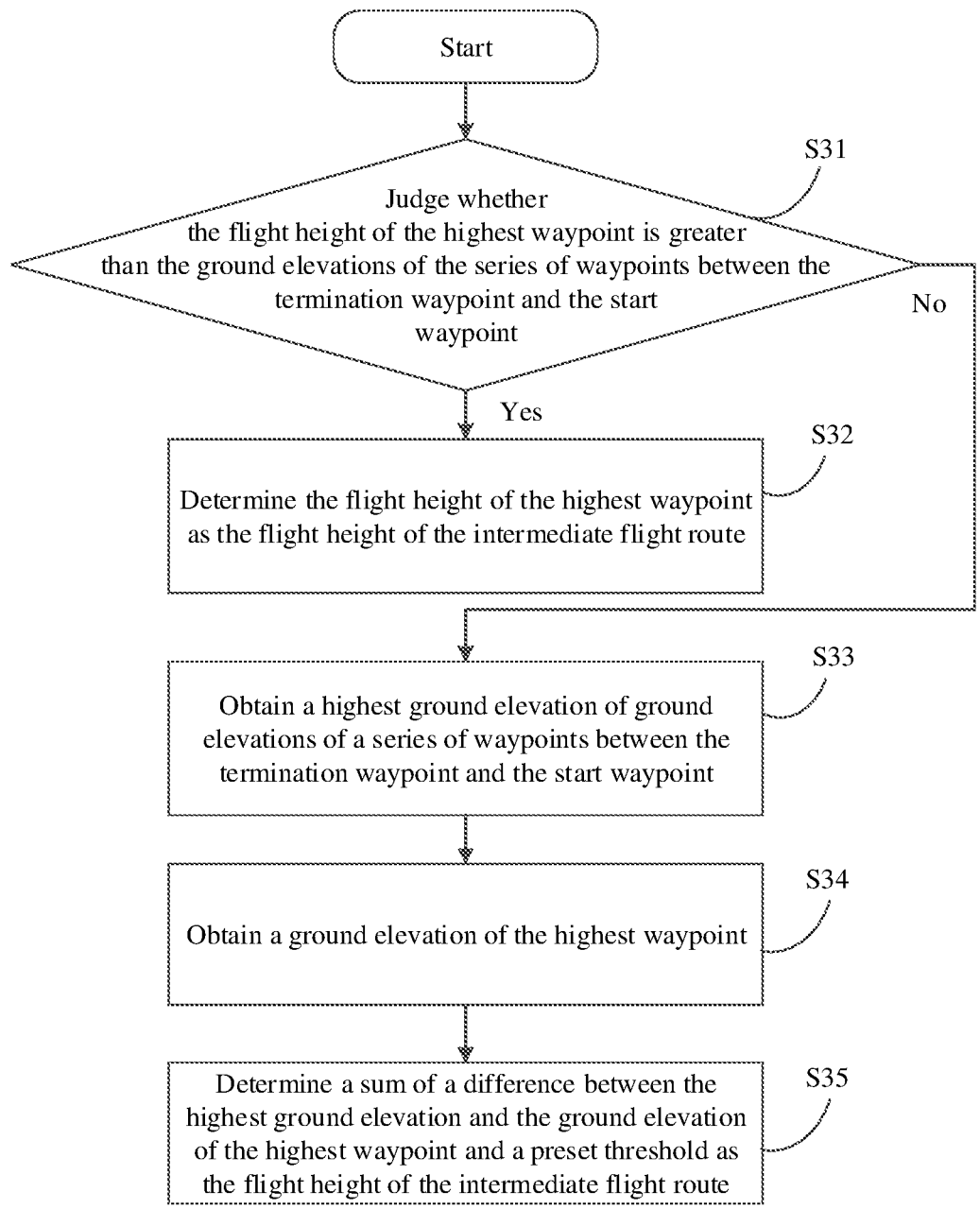
FIG. 3 is a specific flowchart of step S3 of a flight route splicing method of obtaining a flight height of an intermediate flight route according to a flight height of a highest waypoint and ground elevations of a series of waypoints between a termination waypoint and a start waypoint according to an embodiment of the present invention.

In a preferred embodiment, as shown in FIG. 3, the step S3 is performed: obtaining a flight height of an intermediate flight route according to the flight height of the highest waypoint and the ground elevations of the series of waypoints between the termination waypoint and the start waypoint. In practical application, when the unmanned aerial vehicle flies from a former waypoint to a next waypoint, the unmanned aerial vehicle usually flies at a fixed flight height in order to easily control the flight process of the unmanned aerial vehicle, and in order to prevent the unmanned aerial vehicle from colliding with an obstacle in the process of flying from the termination waypoint of the first flight route to the start waypoint of the second flight route, it is necessary to determine the flight height of the unmanned aerial vehicle in the flight process to ensure a safe flight of the unmanned aerial vehicle. The step S3 specifically includes the following.

In step S31, whether the flight height of the highest waypoint is greater than the ground elevations of the series of waypoints between the termination waypoint and the start waypoint is judged. In practical application, the flight height is a distance between the unmanned aerial vehicle and the ground of the highest waypoint. In order to ensure flight safety of the unmanned aerial vehicle, the flight height of the unmanned aerial vehicle from the termination waypoint to the start waypoint needs to exceed the ground elevations of all preset waypoints along the way, so that there is no collision between the unmanned aerial vehicle and an obstacle (such as a mountain, or a tree). Therefore, it is necessary to select, according to information of the ground elevations of the preset waypoints obtained in the step S2, a ground elevation value of a preset waypoint having a highest ground elevation, and judge the flight height of the unmanned aerial vehicle by judging whether the flight height of the unmanned aerial vehicle when the unmanned aerial vehicle flies at the highest waypoint is greater than the largest ground elevation value of all the preset waypoints.

In step S32, the flight height of the highest waypoint is determined as the flight height of the intermediate flight route when the flight height of the highest waypoint is greater than the ground elevations of the series of waypoints between the termination waypoint and the start waypoint. In practical application, if the flight height of the unmanned aerial vehicle when flying at the highest waypoint exceeds the largest ground elevation value of all the preset waypoints, it means that there will be no collision accident between the unmanned aerial vehicle and an obstacle when the unmanned aerial vehicle flies according to the flight height of the highest waypoint, and therefore the flight height of the unmanned aerial vehicle from the termination waypoint to the start waypoint is determined as the flight height of the highest waypoint.

In step S33, a highest ground elevation among the ground elevations of the series of waypoints between the termination waypoint and the start waypoint is obtained when the flight height of the highest waypoint is not greater than the ground elevations of the series of waypoints between the termination waypoint and the start waypoint.

In step S34, a ground elevation of the highest waypoint is obtained.

In step S35, a sum of a difference between the highest ground elevation and the ground elevation of the highest waypoint and a preset threshold is determined as the flight height of the intermediate flight route. Specifically, the ground elevation of the highest waypoint is a difference between an elevation of the highest waypoint and the flight height of the highest waypoint.

In practical application, if the elevation of the unmanned aerial vehicle when flying at the highest waypoint is less than the largest elevation value of all the preset waypoints, it means that there may be a collision accident between the unmanned aerial vehicle and an obstacle when the unmanned aerial vehicle flies according to the flight height of the highest waypoint, and in this case, a difference between the largest ground elevation value of all the preset waypoints and the ground elevation of the highest waypoint is calculated, and a spliced flight height is determined according to the elevation difference.

In practical application, if the unmanned aerial vehicle flies according to the calculated height difference, a collision accident between the unmanned aerial vehicle and an obstacle can be avoided. Generally, in order to consider flight safety and make up for the error of the highest elevation information caused by the setting interval of all the preset waypoints, it is necessary to add a preset threshold on the basis of the height difference. For example, if the height difference is 100 meters and the preset threshold is 20 meters, the spliced flight height of the unmanned aerial vehicle from the termination waypoint to the start waypoint is 120 meters, thereby ensuring the flight safety of the unmanned aerial vehicle and avoiding occurrence of a flight accident.

In step S4, an intermediate flight route is determined according to first geographic location information of the termination waypoint, second geographic location information of the start waypoint, and the flight height of the intermediate flight route. Specifically, the geographic location information of the termination waypoint and the start waypoint may be determined according to coordinate information of the termination waypoint and coordinate information of the start waypoint, and a planned intermediate flight route is obtained according to the flight height of the intermediate flight route.

Figure 4:
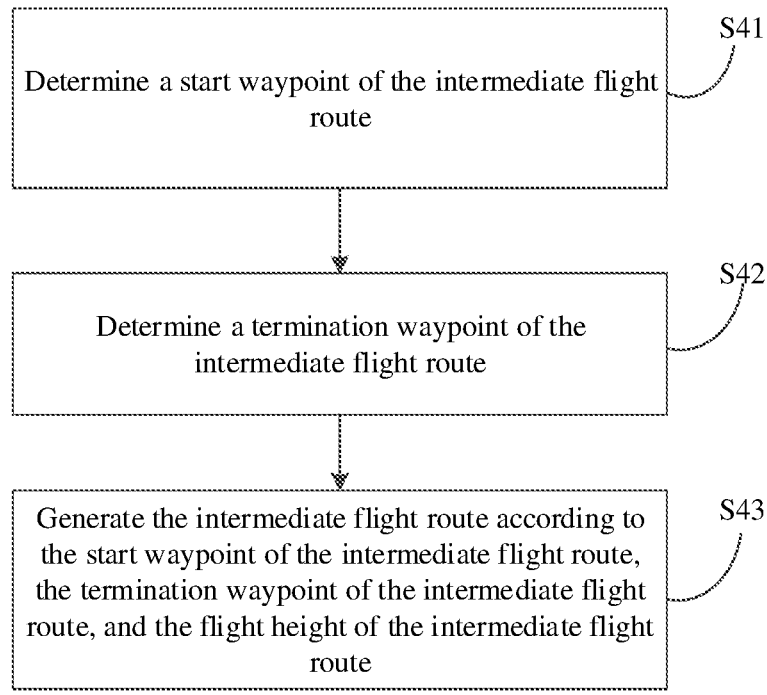
FIG. 4 is a specific flowchart of step S4 of a flight route splicing method of determining an intermediate flight route according to first geographic location information of a termination waypoint, second geographic location information of a start waypoint, and a flight height of the intermediate flight route according to an embodiment of the present invention.

In a preferred embodiment, as shown in FIG. 4, the step S4 of determining the intermediate flight route according to first geographic location information of the termination waypoint, second geographic location information of the start waypoint, and the flight height of the intermediate flight route specifically includes the following.

In step S41, a start waypoint of the intermediate flight route is determined, where geographic location information of the start waypoint of the intermediate flight route is the same as the first geographic location information.

The first geographic location information includes latitude and longitude information of the termination waypoint of the first flight route.

The geographic location information of the start waypoint of the intermediate flight route includes latitude and longitude information of the waypoint, and the latitude and longitude information of the start waypoint of the intermediate flight route is the same as the latitude and longitude information of the termination waypoint of the first flight route.

In step S42, a termination waypoint of the intermediate flight route is determined, where geographic location information of the termination waypoint of the intermediate flight route is the same as the second geographic location information.

The second geographic location information includes latitude and longitude information of the start waypoint of the second flight route. The geographic location information of the termination waypoint of the intermediate flight route includes latitude and longitude information of the waypoint, and the latitude and longitude information of the termination waypoint of the intermediate flight route is the same as the latitude and longitude information of the start waypoint of the second flight route.

In step S43, the intermediate flight route is generated according to the start waypoint of the intermediate flight route, the termination waypoint of the intermediate flight route, and the flight height of the intermediate flight route.

In step S5, the first flight route and the second flight route are spliced according to the intermediate flight route to generate a spliced flight route.

Specifically, the spliced intermediate flight route connects the first flight route and the second flight route, and when the unmanned aerial vehicle actually executes a flight task, the unmanned aerial vehicle may execute two or more flight tasks at a time according to flight route planning of the first flight route, the intermediate spliced flight route, and the second flight route.

Figure 5:
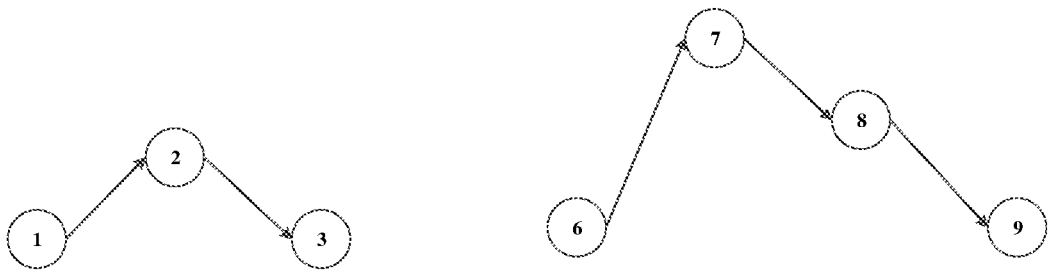
FIG. 5 is a schematic diagram of two flight routes, a first flight route and a second flight route, before splicing according to an embodiment of the present invention.
Figure 6:
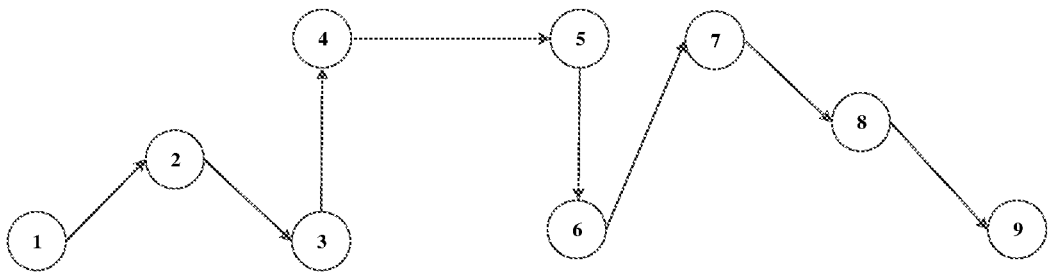
FIG. 6 is a schematic diagram of the two flight routes after splicing according to an embodiment of the present invention.

As shown in FIG. 5, FIG. 5 is a schematic diagram of arrangement of the waypoints according to the elevations before the first flight route and the second flight route are spliced. Numerals 1, 2, and 3 each denote a waypoint on the first flight route, where 3 denotes a termination waypoint, and numerals 6, 7, 8, and 9 each denote a waypoint on the second flight route, where 6 denotes a start waypoint. As shown in FIG. 5, when the waypoint denoted by the numeral 7 is the highest waypoint having the greatest flight height on the first flight route and the second flight route and the flight height of the unmanned aerial vehicle exceeds the largest ground elevation value of the preset waypoints between the termination waypoint and the start waypoint when the unmanned aerial vehicle flies at the highest waypoint, the flight height from the termination waypoint 3 to the start waypoint 6 is determined as the flight height of the highest waypoint 7, and a start waypoint 4 and a termination waypoint 5 of the intermediate flight route are set at the positions of the termination waypoint 3 and the start waypoint 6, respectively, as shown in FIG. 6. FIG. 6 is a schematic diagram of arrangement of the waypoints according to the elevations after the first flight route and the second flight route are spliced. The numeral 4 donates the start waypoint of the intermediate flight route, the numeral 5 donates the termination waypoint of the intermediate flight route, and the numerals 3, 4, 5, and 6 constitute the intermediate flight route. After flying to the waypoint at the numeral 3, the unmanned aerial vehicle sequentially flies to the waypoints at numerals 4, 5, and 6 according to a line connection direction shown in the figure, thereby implementing splicing of the two flight routes.

Through the step S1 to the step S5, in the flight route splicing method provided by the embodiments of the present invention, by obtaining two different flight routes, separately obtaining a flight height of a highest waypoint having a greatest flight height in the first flight route and the second flight route and ground elevations of a series of waypoints between a termination waypoint of the first flight route and a start waypoint of the second flight route, then obtaining a flight height of an intermediate flight route according to the described information, determining the intermediate flight route according to first geographic location information of the termination waypoint, second geographic location information of the start waypoint, and the flight height of the intermediate flight route, and splicing the first flight route and the second flight route according to the intermediate flight route to generate a spliced flight route, the unmanned aerial vehicle can fly to the second flight route according to the spliced flight route after executing the first flight route to execute tasks on the second flight route, so that the unmanned aerial vehicle can execute a plurality of flight routes at a time, thereby improving the task execution efficiency of the unmanned aerial vehicle and reducing the unmanned aerial vehicle resources and time, and further providing richer choices for users and providing more space for customized flight route planning for users.

In practical application, after performing the tasks on the first flight route, a traditional unmanned aerial vehicle needs a user to control the vehicle to fly back and change a battery, and then continue to perform the tasks on the second flight route, or in order to avoid contact with an obstacle in the flight process for flight safety, it is necessary to manually control the unmanned aerial vehicle to fly to the start waypoint of the second flight route, and then the unmanned aerial vehicle executes the tasks on the second flight route. Therefore, the embodiments of the present invention provide a flight route splicing method, so that the unmanned aerial vehicle can execute two or more flight routes at a time.

Specifically, in an embodiment, the step S1 is performed: obtaining a first flight route and a second flight route of an unmanned aerial vehicle. The first flight route may be a flight route that the unmanned aerial vehicle is currently executing, and the second flight route is a next flight route to be executed by the unmanned aerial vehicle.

Specifically, in an embodiment, the step S2 is performed: obtaining a flight height of a highest waypoint having a greatest flight height in the first flight route and the second flight route and ground elevations of a series of waypoints between a termination waypoint of the first flight route and a start waypoint of the second flight route. In practical application, the flight height of the highest waypoint having the greatest flight height and the ground elevations of the series of waypoints between the two flight routes may be directly obtained from the planning and design of the first flight route and the second flight route.

In practical application, a series of waypoints may be arranged between the first flight route and the second flight route in a preset distance interval according to geographical locations went through by the first flight route and the second flight route. For example, a preset waypoint is set every one meter or ten meters. In practical application, the interval can be set according to requirements, for example, the preset waypoint setting interval can be increased in a large flight range, and the preset waypoint setting interval can be reduced in a small range. The present invention is not limited thereto.

In a preferred embodiment, as shown in FIG. 3, the step S3 is performed: obtaining a flight height of an intermediate flight route according to the flight height of the highest waypoint and the ground elevations of the series of waypoints between the termination waypoint and the start waypoint. In practical application, when the unmanned aerial vehicle flies from a former waypoint to a next waypoint, the unmanned aerial vehicle usually flies at a fixed flight height in order to easily control the flight process of the unmanned aerial vehicle, and in order to prevent the unmanned aerial vehicle from colliding with an obstacle in the process of flying from the termination waypoint of the first flight route to the start waypoint of the second flight route, it is necessary to determine the flight height of the unmanned aerial vehicle in the flight process to ensure a safe flight of the unmanned aerial vehicle. The step S3 specifically includes the following.

In step S31, whether the flight height of the highest waypoint is greater than the ground elevations of the series of waypoints between the termination waypoint and the start waypoint is judged. In practical application, the flight height is a distance between the unmanned aerial vehicle and the ground of the highest waypoint. In order to ensure flight safety of the unmanned aerial vehicle, the flight height of the unmanned aerial vehicle from the termination waypoint to the start waypoint needs to exceed the ground elevations of all preset waypoints along the way, so that there is no collision between the unmanned aerial vehicle and an obstacle (such as a mountain, or a tree). Therefore, it is necessary to select, according to information of the ground elevations of the preset waypoints obtained in the step S2, a ground elevation value of a preset waypoint having a highest ground elevation, and judge the flight height of the unmanned aerial vehicle by judging whether the flight height of the unmanned aerial vehicle when the unmanned aerial vehicle flies at the highest waypoint is greater than the largest ground elevation value of all the preset waypoints.

In step S32, the flight height of the highest waypoint is determined as the flight height of the intermediate flight route when the flight height of the highest waypoint is greater than the ground elevations of the series of waypoints between the termination waypoint and the start waypoint. In practical application, if the flight height of the unmanned aerial vehicle when flying at the highest waypoint exceeds the largest ground elevation value of all the preset waypoints, it means that there will be no collision accident between the unmanned aerial vehicle and an obstacle when the unmanned aerial vehicle flies according to the flight height of the highest waypoint, and therefore the flight height of the unmanned aerial vehicle from the termination waypoint to the start waypoint is determined as the flight height of the highest waypoint.

In step S33, a highest ground elevation among the ground elevations of the series of waypoints between the termination waypoint and the start waypoint is obtained when the flight height of the highest waypoint is not greater than the ground elevations of the series of waypoints between the termination waypoint and the start waypoint.

In step S34, a ground elevation of the highest waypoint is obtained.

In step S35, a sum of a difference between the highest ground elevation and the ground elevation of the highest waypoint and a preset threshold is determined as the flight height of the intermediate flight route. Specifically, the ground elevation of the highest waypoint is a difference between an elevation of the highest waypoint and the flight height of the highest waypoint.

In practical application, if the elevation of the unmanned aerial vehicle when flying at the highest waypoint is less than the largest elevation value of all the preset waypoints, it means that there may be a collision accident between the unmanned aerial vehicle and an obstacle when the unmanned aerial vehicle flies according to the flight height of the highest waypoint, and in this case, a difference between the largest ground elevation value of all the preset waypoints and the ground elevation of the highest waypoint is calculated, and a spliced flight height is determined according to the elevation difference.

In practical application, if the unmanned aerial vehicle flies according to the calculated height difference, a collision accident between the unmanned aerial vehicle and an obstacle can be avoided. Generally, to consider flight safety and make up for the error of the highest elevation information caused by the setting interval of all the preset waypoints, it is necessary to add a preset threshold on the basis of the height difference. For example, if the height difference is 100 meters and the preset threshold is 20 meters, the spliced flight height of the unmanned aerial vehicle from the termination waypoint to the start waypoint is 120 meters, thereby ensuring the flight safety of the unmanned aerial vehicle and avoiding occurrence of a flight accident.

In a preferred embodiment, as shown in FIG. 4, the step S4 of determining the intermediate flight route according to first geographic location information of the termination waypoint, second geographic location information of the start waypoint, and the flight height of the intermediate flight route specifically includes the following.

In step S41, a start waypoint of the intermediate flight route is determined, where geographic location information of the start waypoint of the intermediate flight route is the same as the first geographic location information. In practical application, the latitude and longitude information of the start waypoint of the intermediate flight route is the latitude and longitude information of the unmanned aerial vehicle at the termination waypoint.

In step S42, a termination waypoint of the intermediate flight route is determined, where geographic location information of the termination waypoint of the intermediate flight route is the same as the second geographic location information. In practical application, the latitude and longitude information of the termination waypoint of the intermediate flight route is the latitude and longitude information of the unmanned aerial vehicle at the start waypoint.

In step S43, the intermediate flight route is generated according to the start waypoint of the intermediate flight route, the termination waypoint of the intermediate flight route, and the flight height of the intermediate flight route.

The following will describe the steps of the flight route splicing method in combination with specific application examples. FIG. 5 is a schematic diagram of the arrangement of the waypoints according to the elevations before the first flight route and the second flight route are spliced. Numerals 1, 2, and 3 each denote a waypoint on the first flight route, where 3 denotes the termination waypoint, and numeral 6, 7, 8 and 9 each denote a waypoint on the second flight route, where 6 denotes the start waypoint. As shown in FIG. 5, when the waypoint denoted by the numeral 7 is the highest waypoint having the greatest flight height on the first flight route and the second flight route and the flight height of the unmanned aerial vehicle exceeds the largest ground elevation value of the preset waypoints between the termination waypoint and the start waypoint when the unmanned aerial vehicle flies at the highest waypoint, the flight height from the termination waypoint 3 to the start waypoint 6 is determined as the flight height of the highest waypoint 7, and a start waypoint 4 and a termination waypoint 5 of the intermediate flight route are set at the positions of the termination waypoint 3 and the start waypoint 6, respectively, as shown in FIG. 6. FIG. 6 is a schematic diagram of the arrangement of the waypoints according to the elevations after the first flight route and the second flight route are spliced. The numeral 4 donates the start waypoint of the intermediate flight route, the numeral 5 donates the termination waypoint of the intermediate flight route, and the numerals 3, 4, 5, and 6 constitute the spliced flight route. After flying to the waypoint at the numeral 3, the unmanned aerial vehicle sequentially flies to the waypoints at numerals 4, 5, and 6 according to a line connection direction shown in the figure, thereby implementing splicing of the two flight routes.

Through the step S1 to the step S5, in the flight route splicing method provided by the embodiments of the present invention, by obtaining two different flight routes, separately obtaining a flight height of a highest waypoint having a highest flight height in the first flight route and the second flight route and ground elevations of a series of waypoints between a termination waypoint of the first flight route and a start waypoint of the second flight route, then obtaining a flight height of an intermediate flight route according to the described information, determining the intermediate flight route according to first geographic location information of the termination waypoint, second geographic location information of the start waypoint, and the flight height of the intermediate flight route, and splicing the first flight route and the second flight route according to the intermediate flight route to generate a spliced flight route, the unmanned aerial vehicle can fly to the second flight route according to the spliced flight route after executing the first flight route to execute tasks on the second flight route, so that the unmanned aerial vehicle can execute a plurality of flight routes at a time, thereby improving the task execution efficiency of the unmanned aerial vehicle and saving the unmanned aerial vehicle resources and time, and further providing richer choices for users and providing more space for customized flight route planning for users.

Figure 7:
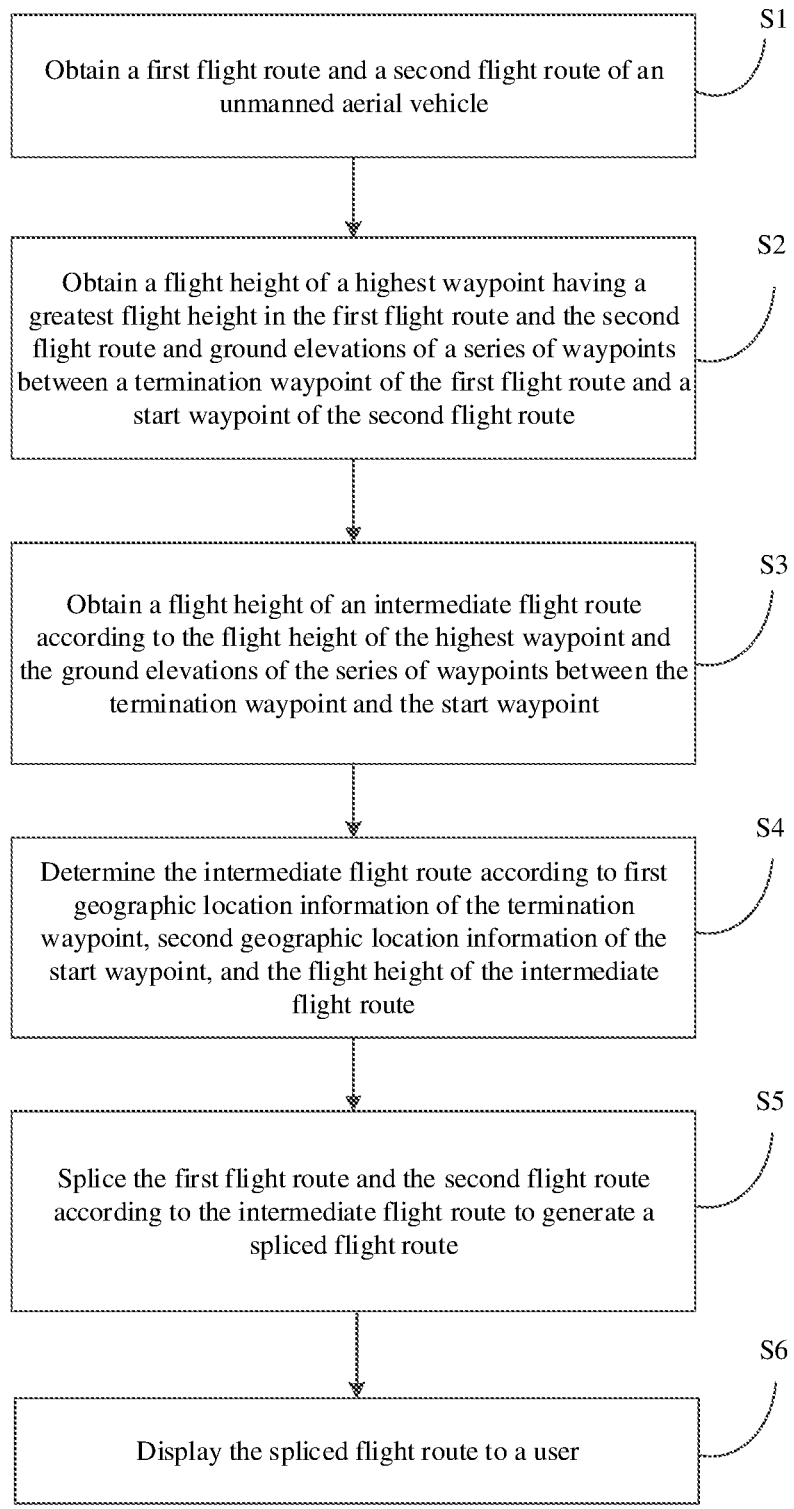
FIG. 7 is a flowchart of a flight route splicing method according to another embodiment of the present invention.

Specifically, in an embodiment of the present invention, as shown in FIG. 7, the flight route splicing method further includes the following.

In step S6, the spliced flight route is displayed to a user. In practical application, the flight route splicing method is applied to a user terminal, and after the flight route splicing is completed, the spliced flight route may be displayed to the user through the user terminal.

In practical application, due to the limitations of the battery or power system of the unmanned aerial vehicle, the unmanned aerial vehicle can only fly continuously within a preset flight duration. If a distance between the two flight routes is long or the duration required to execute the two flight routes exceeds the maximum flight duration allowed by the unmanned aerial vehicle, a situation will be caused that the unmanned aerial vehicle cannot return or complete the flight route task.

Figure 8:
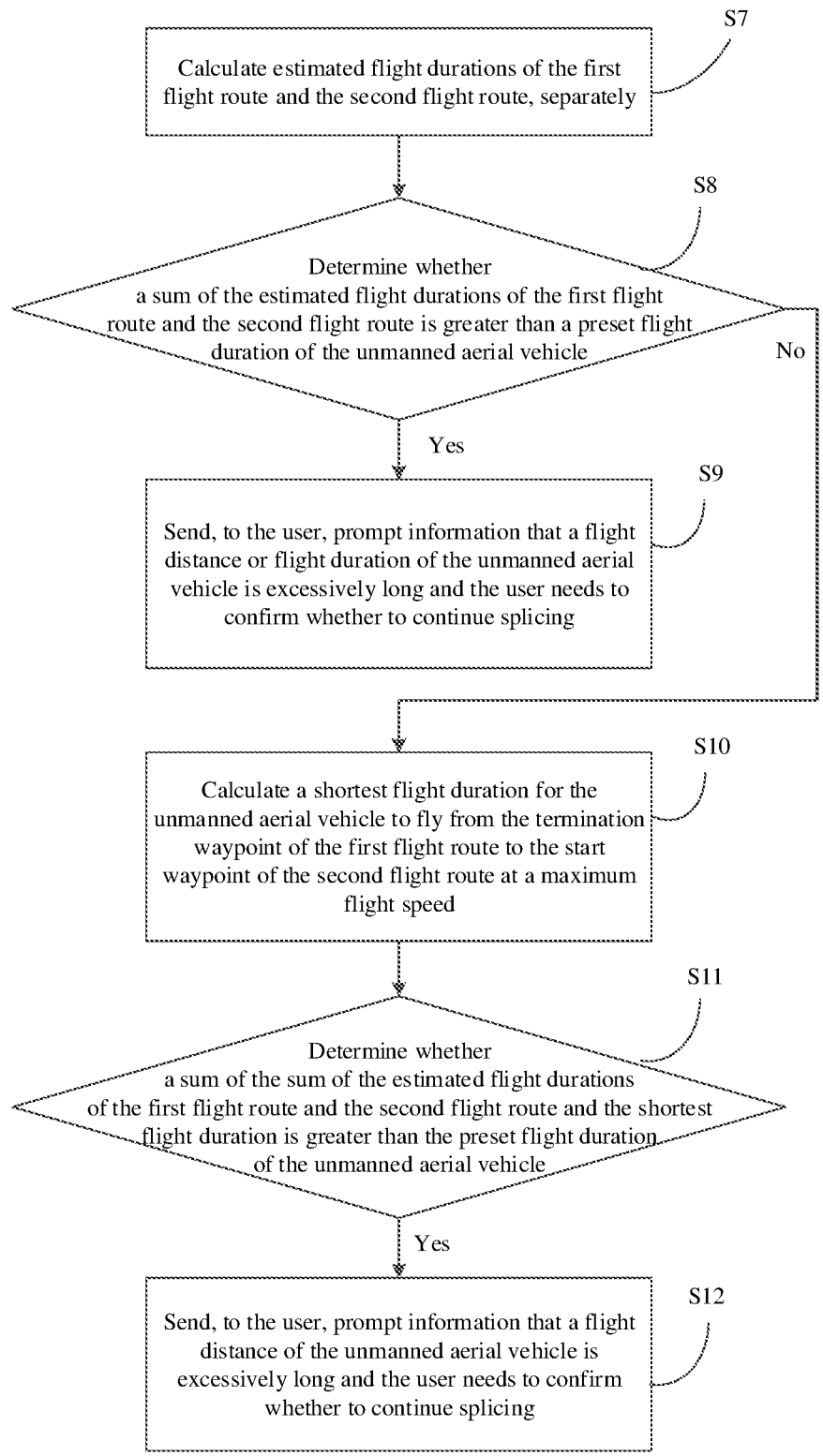
FIG. 8 is a flowchart of a flight route splicing method according to still another embodiment of the present invention.

In a preferred embodiment, as shown in FIG. 8, after the step S4 and before the step S5, the flight route splicing method further includes the following.

In step S7, estimated flight durations of the first flight route and the second flight route are calculated, separately. In practical application, due to the limitations of the battery or power system of the unmanned aerial vehicle, the unmanned aerial vehicle can only fly continuously within a preset flight duration. Therefore, before performing the flight route splicing method, it is necessary to judge whether the unmanned aerial vehicle can execute flight tasks on two or more different flight routes at a time.

In step S8, whether a sum of the estimated flight durations of the first flight route and the second flight route is greater than a preset flight duration of the unmanned aerial vehicle is judged. In practical application, the flight duration of the unmanned aerial vehicle from the termination waypoint of the first flight route to the start waypoint of the second flight route also needs to be taken account in the preset flight duration of the unmanned aerial vehicle, to prevent the situation in which the unmanned aerial vehicle cannot complete the flight task on the second flight route due to insufficient power, and therefore it is necessary to first judge whether the sum of the estimated flight durations of the first flight route and the second flight route is greater than the preset flight duration that power of the unmanned aerial vehicle can support.

In step S9, prompt information is sent to a user that a flight distance or flight duration of the unmanned aerial vehicle is excessively long and the user needs to confirm whether to continue splicing when the sum of the estimated flight durations of the first flight route and the second flight route is greater than the preset flight duration of the unmanned aerial vehicle. In practical application, if the flight duration of the unmanned aerial vehicle executing the two flight routes has exceeded the preset flight duration that the power of the unmanned aerial vehicle power can support, the information that the flight distance or the flight duration required for the unmanned aerial vehicle is excessively long and the user needs to confirm whether to continue the flight route splicing operation is then displayed to the user through the display screen of the user terminal.

In step S10, a shortest flight duration for the unmanned aerial vehicle to fly from the termination waypoint of the first flight route to the start waypoint of the second flight route at a maximum flight speed is calculated when the sum of the estimated flight durations of the first flight route and the second flight route is not greater than the preset flight duration of the unmanned aerial vehicle. In practical application, the flight distance between the termination waypoint and the start waypoint is obtained based on geographic coordinates of a viewpoint included in the geographic location information of the start waypoint and the geographic location information of the termination waypoint, the duration required for the unmanned aerial vehicle to fly through the above flight distance at a preset maximum flight speed may be determined as the shortest flight duration. It should be noted that in practical application, the shortest flight duration may alternatively be determined according to the average flight speed of the unmanned aerial vehicle or the average flight duration of the unmanned aerial vehicle flying from the termination waypoint to the start waypoint. The present invention is not limited thereto.

In step S11, whether a sum of the sum of the estimated flight durations of the first flight route and the second flight route and the shortest flight duration is greater than the preset flight duration of the unmanned aerial vehicle is judged. In practical application, if the preset flight duration of the unmanned aerial vehicle is greater than the sum of the sum of the execution durations required by the unmanned aerial vehicle to execute the first flight route and the second flight route and the shortest duration, it means that the unmanned aerial vehicle can execute the flight tasks on the two flight routes at a time, and therefore the two flight routes can be spliced. The step S5 is then performed.

In step S12, prompt information is send to the user that the flight distance of the unmanned aerial vehicle is excessively long and the user needs to confirm whether to continue splicing when the sum of the sum of the estimated flight durations of the first flight route and the second flight route and the shortest flight duration is greater than the preset flight duration of the unmanned aerial vehicle. In practical application, if the preset flight duration of unmanned aerial vehicle is not sufficient to execute the two flight routes. In order to prevent the unmanned aerial vehicle from failing to complete the flight tasks normally or returning and landing safely, information that the flight distance or the flight duration required for the unmanned aerial vehicle is excessively long and the user needs to confirm whether to continue the flight route splicing operation may be displayed to the user through the display screen of the user terminal, so that flight route splicing can only be carried out when the power of the unmanned aerial vehicle can support the tasks on a plurality of flight routes, or when the user confirms continuing, thereby avoiding the problem that the unmanned aerial vehicle cannot complete the flight route tasks or the unmanned aerial vehicle cannot return safely after the flight routes are spliced.

In practical application, by using the flight route splicing method, splicing of two or more flight routes can be implemented, so that an unmanned aerial vehicle can execute the tasks on two or more flight routes at a time, as long as a battery or power source of the unmanned aerial vehicle is sufficient to support the unmanned aerial vehicle to complete the tasks on the flight routes. The present invention is not limited thereto.

Through the step Si to the step S12, in the flight route splicing method provided by the embodiments of the present invention, by obtaining two different flight routes, separately obtaining a flight height of a highest waypoint having a highest flight height in the first flight route and the second flight route and ground elevation heights of a series of waypoints between a termination waypoint of the first flight route and a start waypoint of the second flight route, then obtaining a flight height of an intermediate flight route according to the described information, determining the intermediate flight route according to first geographic location information of the termination waypoint, second geographic location information of the start waypoint, and the flight height of the intermediate flight route, and splicing the first flight route and the second flight route according to the intermediate flight route, to generate a spliced flight route, the unmanned aerial vehicle can fly to the second flight route according to the spliced flight route after executing the first flight route, to execute tasks on the second flight route, so that the unmanned aerial vehicle can execute a plurality of flight routes at a time, thereby improving the task execution efficiency of the unmanned aerial vehicle and saving the unmanned aerial vehicle resources and time, and further providing richer choices for users and providing more space for customized flight route planning for users.

Figure 9:
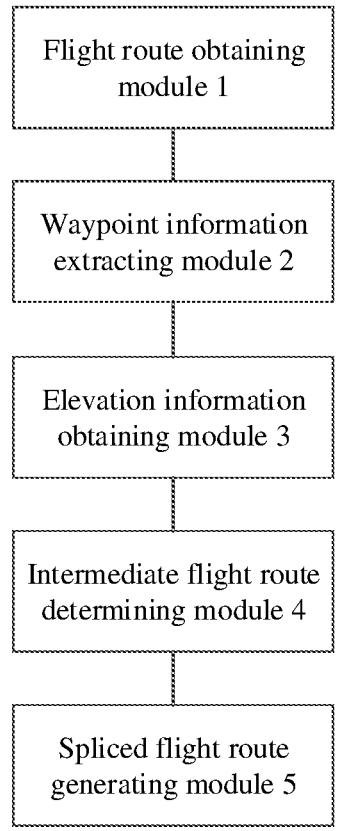
FIG. 9 is a schematic structural block diagram of a flight route splicing system according to an embodiment of the present invention.

An embodiment of the present invention further provides a flight route-based splicing system. As shown in FIG. 9, the flight route-based splicing system includes:

a flight route obtaining module 1, configured to obtain a first flight route and a second flight route of an unmanned aerial vehicle, where reference may be made to the related description in step Si in the above-mentioned embodiments for the detailed functions of the flight route obtaining module 1;

a waypoint information extracting module 2, configured to obtain a flight height of a highest waypoint having a greatest flight height in the first flight route and the second flight route and ground elevations of a series of waypoints between a termination waypoint of the first flight route and a start waypoint of the second flight route, where reference may be made to the related description in step S2 in the above-mentioned embodiments for the detailed functions of the waypoint information extracting module 2;

an elevation information obtaining module 3, configured to obtain a flight height of an intermediate flight route according to the flight height of the highest waypoint and the ground elevations of the series of waypoints between the termination waypoint and the start waypoint, where the intermediate flight route is used for connecting the first flight route and the second flight route and is located between the first flight route and the second flight route, where reference may be made to the related description in step S3 in the above-mentioned embodiments for the detailed functions of the elevation information obtaining module 3;

an intermediate flight route determining module 4, configured to determine an intermediate flight route according to first geographic location information of the termination waypoint, second geographic location information of the start waypoint, and the flight height of the intermediate flight route, where reference may be made to the related description in step S4 in the above-mentioned embodiments for the detailed functions of the intermediate flight route determining module 4; and a spliced flight route generating module 5, configured to splice the first flight route and the second flight route according to the intermediate flight route to generate a spliced flight route, where reference may be made to the related description in step S5 in the above-mentioned embodiments for the detailed functions of the spliced flight route generating module 5.

Through the collaborative functioning of the components, the flight route splicing system provided in the embodiments of the present invention obtains two different flight routes, separately obtains first waypoint information of a termination waypoint of the first flight route, second waypoint information of a start waypoint of the second flight route, and third waypoint information of a highest waypoint having a highest flight height in the two flight routes, then obtains elevation information between the termination waypoint and the start waypoint, and generates a spliced flight route according to the described information, so that the unmanned aerial vehicle can fly to the second flight route according to the spliced flight route after executing the first flight route to execute tasks on the second flight route, and the unmanned aerial vehicle can execute a plurality of flight routes at a time, thereby improving the task execution efficiency of the unmanned aerial vehicle and saving the unmanned aerial vehicle resources and time, and further providing richer choices for users and providing more space for customized flight route planning for users.

Specifically, in an embodiment, the waypoint information extracting module 3 includes:

a judging sub-module, configured to judge whether the flight height of the highest waypoint is greater than the ground elevations of the series of waypoints between the termination waypoint and the start waypoint, where reference may be made to the related description in step S31 in the above-mentioned embodiments for the detailed functions of the judging sub-module;

a first determining sub-module, configured to determine the flight height of the highest waypoint as the flight height of the intermediate flight route when the flight height of the highest waypoint is greater than the ground elevations of the series of waypoints between the termination waypoint and the start waypoint, where reference may be made to the related description in step S32 in the above-mentioned embodiments for the detailed functions of the first determining sub-module;

a first obtaining sub-module, configured to obtain a highest ground elevation among the ground elevations of the series of waypoints between the termination waypoint and the start waypoint when the flight height of the highest waypoint is not greater than the ground elevations of the series of waypoints between the termination waypoint and the start waypoint, where reference may be made to the related description in step S33 in the above-mentioned embodiments for the detailed functions of the first obtaining sub-module;

a second obtaining sub-module, configured to obtain a ground elevation of the highest waypoint, where reference may be made to the related description in step S34 in the above-mentioned embodiments for the detailed functions of the second obtaining sub-module; and a second determining sub-module, configured to determine a sum of a difference between the highest ground elevation and the ground elevation of the highest waypoint and a preset threshold as the flight height of the intermediate flight route, where reference may be made to the related description in step S35 in the above-mentioned embodiments for the detailed functions of the second determining sub-module.

In practical application, the ground elevation of the highest waypoint is a difference between an elevation of the highest waypoint and the flight height of the highest waypoint.

Specifically, in an embodiment, the intermediate flight route determining module 4 includes:

a start waypoint determining sub-module, configured to determine a start waypoint of the intermediate flight route, where geographic location information of the start waypoint of the intermediate flight route is the same as the first geographic location information, and where reference may be made to the related description in step S41 in the above-mentioned embodiments for the detailed functions of the start waypoint determining sub-module;

a termination waypoint determining sub-module, configured to determine a termination waypoint of the intermediate flight route, where geographic location information of the termination waypoint of the intermediate flight route is the same as the second geographic location information, where reference may be made to the related description in step S42 in the above-mentioned embodiments for the detailed functions of the termination waypoint determining sub-module; and an intermediate flight route generating sub-module, configured to generate the intermediate flight route according to the start waypoint of the intermediate flight route, the termination waypoint of the intermediate flight route, and the flight height of the intermediate flight route, where reference may be made to the related description in step S43 in the above-mentioned embodiments for the detailed functions of the intermediate flight route generating sub-module.

In practical application, the first geographic location information includes latitude and longitude information of the termination waypoint and the second geographic location information includes latitude and longitude information of the start waypoint.

Specifically, in an embodiment, the flight route splicing system further includes:

a display module, configured to display the spliced flight route to a user, where reference may be made to the related description in step S6 in the above-mentioned embodiments for the detailed functions of the display module;

an estimated flight duration calculating module, configured to calculate estimated flight durations of the first flight route and the second flight route, separately, where reference may be made to the related description in step S7 in the above-mentioned embodiments for the detailed functions of the estimated flight duration calculating module;

a first judging module, configured to judge whether a sum of the estimated flight durations of the first flight route and the second flight route is greater than a preset flight duration of the unmanned aerial vehicle, where reference may be made to the related description in step S8 in the above-mentioned embodiments for the detailed functions of the first judging module;

a first prompt information sending module, configured to send, to the user, prompt information that the flight distance or the flight duration of the unmanned aerial vehicle is excessively long and the user needs to confirm whether to continue splicing when the sum of the sum of the estimated flight durations of the first flight route and the second flight route and the shortest flight duration is greater than the preset flight duration of the unmanned aerial vehicle, where reference may be made to the related description in step S9 in the above-mentioned embodiments for the detailed functions of the first prompt information sending module;

a shortest flight duration calculating module, configured to calculate a shortest flight duration for the unmanned aerial vehicle to fly from the termination waypoint of the first flight route to the start waypoint of the second flight route at a maximum flying speed when the sum of the estimated flight durations of the first flight route and the second flight route is not greater than the preset flight duration of the unmanned aerial vehicle, where reference may be made to the related description in step S10 in the above-mentioned embodiments for the detailed functions of the shortest flight duration calculating module;

a second judging module, configured to judge whether a sum of the sum of the estimated flight durations of the first flight route and the second flight route and the shortest flight duration is greater than the preset flight duration of the unmanned aerial vehicle, where reference may be made to the related description in step Si 1 in the above-mentioned embodiments for the detailed functions of the second judging module; and a second prompt information sending module, configured to send, to the user, prompt information that the flight distance of the unmanned aerial vehicle is excessively long and the user needs to confirm whether to continue splicing when the sum of the sum of the estimated flight durations of the first flight route and the second flight route and the shortest flight duration is greater than the preset flight duration of the unmanned aerial vehicle, where reference may be made to the related description in step S12 in the above-mentioned embodiments for the detailed functions of the second prompt information sending module.

An embodiment of the present invention also provides a non-transient computer storage medium. The computer storage medium stores computer executable instructions which can execute the flight route splicing method according to any of the method embodiments, where the storage medium may be a magnetic disk, an optical disk, a read-only memory (ROM), a random-access memory (RAM), a flash memory, a hard disk drive (HDD), or a solid-state drive (SSD). The storage medium may further include a combination of the above-mentioned types of memories.

As it would be understood by those skilled in the art, all or part of the process of implementing the above-mentioned embodiment methods can be accomplished by a computer program instructing related hardware , the program can be stored in a computer readable storage medium, and the program, when executed, can include the processes of the embodiments of the above-mentioned methods. The storage medium may be a magnetic disk, an optical disk, an ROM, an RAM, or the like.

Figure 10:
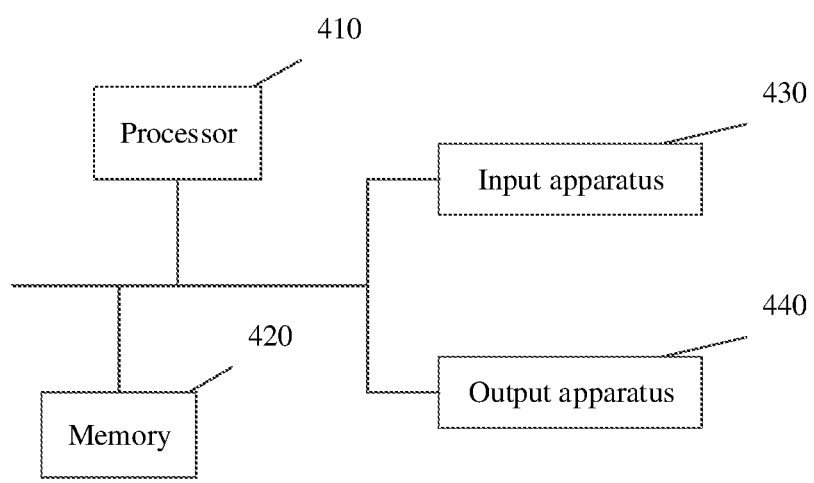
FIG. 10 is a schematic structural diagram of a computer device according to an embodiment of the present invention.

An embodiment of the present invention further provides a computer device, a schematic structural diagram of which is shown in FIG. 10. The computer device includes one or more processors 410 and a memory 420, and one processor 410 is used as an example in FIG. 10.

The computer device may further include an input apparatus 430 and an output apparatus 440.

The processor 410, the memory 420, the input apparatus 430, and the output apparatus 440 may be connected via a bus or other methods, and being connected via a bus is used as an example in FIG. 10.

The processor 410 may be a central processing unit (CPU). The processor 410 may alternatively be another general-purpose processor, a digital signal processor (DSP), an application specific integrated circuit (ASIC), a field-programmable gate array (FPGA), or other programmable logic device, a discrete gate or transistor logic device, a discrete hardware component or the like, or a combination of the above-mentioned chips. The general-purpose processor may be a microprocessor, or the processor may be any conventional processor or the like.

The memory 420, as a non-transient computer-readable storage medium, can be used for storing non-transient software programs, or non-transient computer executable programs and modules, such as the program instructions/modules corresponding to the flight route splicing method in the embodiments of this application, and the processor 410 runs the non-transient software programs, instructions, and modules stored in the memory 420 to execute various functional applications and data processing of the server, that is, implementing the flight route splicing method in the above-mentioned method embodiments.

The memory 420 may include a program storage area and a data storage area. The program storage area may store an operating system and an application program required for at least one function. The data storage area may store data created during use of the processing apparatus for the flight route splicing method and the like. In addition, the memory 420 may include a high-speed random access memory, and may further include non-transient memory such as at least one disk storage device, a flash storage device, or other non-transient solid-state storage device. In some embodiments, the memory 420 may optionally include memories remotely disposed with respect to the processor 410, and these memories may be connected to a flight route splicing apparatus via a network. Examples of the networks include, but are not limited to, the Internet, an intranet, a local area network, a mobile communication network, or a combination thereof.

The input apparatus 430 may receive inputted numeric or character information and generate user settings related to the processing apparatus for a flight route splicing operation and a key signal input related to function control. The output apparatus 440 may include a display device such as a display screen.

One or more modules are stored in the memory 420 and when executed by one or more processors 410, the method as shown in FIG. 2 to FIG. 8 is performed.

The product can execute the method provided by the embodiments of the present invention, and has corresponding functional modules and beneficial effects for executing the method. For technical details not described in detail in the embodiments of the present invention, reference may be made to the relevant descriptions in the embodiments as shown in FIG. 2 to FIG. 8.

Apparently, the above-mentioned embodiments are merely examples for clarity of illustration and are not limited to implementations. Other variations or alterations in different forms may be made on the basis of the above description for those of ordinary skill in the art. There is no need for and cannot be an exhaustive list of all implementations herein. The apparent changes or variations arising therefrom still fall within the scope of protection of the present invention.

What is claimed is:

1. A flight route splicing method, comprising:
   obtaining a first flight route and a second flight route of an unmanned aerial vehicle;
   obtaining a flight height of a highest waypoint having a greatest flight height in the first flight route and the second flight route and ground elevations of a series of waypoints between a termination waypoint of the first flight route and a start waypoint of the second flight route;
   obtaining a flight height of an intermediate flight route according to the flight height of the highest waypoint and the ground elevations of the series of waypoints between the termination waypoint and the start waypoint, wherein the intermediate flight route is used for connecting the first flight route and the second flight route and is located between the first flight route and the second flight route;
   determining the intermediate flight route according to first geographic location information of the termination waypoint, second geographic location information of the start waypoint, and the flight height of the intermediate flight route; and splicing the first flight route and the second flight route according to the intermediate flight route to generate a spliced flight route.

2. The flight route splicing method according to claim 1, wherein obtaining a flight height of the intermediate flight route according to the flight height of the highest waypoint and the ground elevations of the series of waypoints between the termination waypoint and the start waypoint comprises:
   determining whether the flight height of the highest waypoint is greater than the ground elevations of the series of waypoints between the termination waypoint and the start waypoint; and
   determining the flight height of the highest waypoint as the flight height of the intermediate flight route when the flight height of the highest waypoint is greater than the ground elevations of the series of waypoints between the termination waypoint and the start waypoint.

3. The flight route splicing method according to claim 2, further comprising:
   obtaining a highest ground elevation among the ground elevations of the series of waypoints between the termination waypoint and the start waypoint when the flight height of the highest waypoint is not greater than the ground elevations of the series of waypoints between the termination waypoint and the start waypoint;
   obtaining a ground elevation of the highest waypoint; and
   determining a sum of a difference between the highest ground elevation and the ground elevation of the highest waypoint and a preset threshold as the flight height of the intermediate flight route.

4. The flight route splicing method according to claim 3, wherein the ground elevation of the highest waypoint is a difference between an elevation of the highest waypoint and the flight height of the highest waypoint.

5. The flight route splicing method according to claim 1, wherein determining the intermediate flight route according to first geographic location information of the termination waypoint, second geographic location information of the start waypoint, and the flight height of the intermediate flight route comprises:
   determining a start waypoint of the intermediate flight route, wherein geographic location information of the start waypoint of the intermediate flight route is the same as the first geographic location information;
   determining a termination waypoint of the intermediate flight route, wherein geographic location information of the termination waypoint of the intermediate flight route is the same as the second geographic location information; and
   generating the intermediate flight route according to the start waypoint of the intermediate flight route, the termination waypoint of the intermediate flight route, and the flight height of the intermediate flight route.

6. The flight route splicing method according to claim 1, wherein the first geographic location information comprises latitude and longitude information of the termination waypoint and the second geographic location information comprises latitude and longitude information of the start waypoint.

7. The flight route splicing method according to claim 1, further comprising:
   displaying the spliced flight route to a user.

8. The flight route splicing method according to claim 1, further comprising:

calculating estimated flight durations of the first flight route and the second flight route, separately;
   judging whether a sum of the estimated flight durations of the first flight route and the second flight route is greater than a preset flight duration of the unmanned aerial vehicle; and
   sending, to the user, prompt information that a flight distance or flight duration of the unmanned aerial vehicle is excessively long and the user needs to confirm whether to continue splicing when the sum of the estimated flight durations of the first flight route and the second flight route is greater than the preset flight duration of the unmanned aerial vehicle.

9. The flight route splicing method according to claim 8, further comprising:
   calculating a shortest flight duration for the unmanned aerial vehicle to fly from the termination waypoint of the first flight route to the start waypoint of the second flight route at a maximum flight speed when the sum of the estimated flight durations of the first flight route and the second flight route is not greater than the preset flight duration of the unmanned aerial vehicle;
   judging whether a sum of the sum of the estimated flight durations of the first flight route and the second flight route and the shortest flight duration is greater than the preset flight duration of the unmanned aerial vehicle; and
   sending, to the user, prompt information that a flight distance or flight duration of the unmanned aerial vehicle is excessively long and the user needs to confirm whether to continue splicing when the sum of the sum of the estimated flight durations of the first flight route and the second flight route and the shortest flight duration is greater than the preset flight duration of the unmanned aerial vehicle.

10. A flight route splicing system, comprising:
   at least one processor disposed in the system; and
   a memory communicatively connected to the at least one processor, the memory storing instructions executable by the at least one processor, the instructions, when executed by the at least one processor, causing the at least one processor to perform the following operations:
   obtaining a first flight route and a second flight route of an unmanned aerial vehicle;
   obtaining a flight height of a highest waypoint having a greatest flight height in the first flight route and the second flight route and ground elevations of a series of waypoints between a termination waypoint of the first flight route and a start waypoint of the second flight route;
   obtaining a flight height of an intermediate flight route according to the flight height of the highest waypoint and the ground elevations of the series of waypoints between the termination waypoint and the start waypoint, wherein the intermediate flight route is used for connecting the first flight route and the second flight route and is located between the first flight route and the second flight route;
   determining the intermediate flight route according to first geographic location information of the termination waypoint, second geographic location information of the start waypoint, and the flight height of the intermediate flight route; and
   splicing the first flight route and the second flight route according to the intermediate flight route to generate a spliced flight route.

11. The flight route splicing system according to claim 10, wherein the processor is further configured to:
   determine whether the flight height of the highest waypoint is greater than the ground elevations of the series of waypoints between the termination waypoint and the start waypoint; and
   determine the flight height of the highest waypoint as the flight height of the intermediate flight route when the flight height of the highest waypoint is greater than the ground elevations of the series of waypoints between the termination waypoint and the start waypoint.

12. The flight route splicing system according to claim 11, wherein the processor is further configured to:
   a highest ground elevation among the ground elevations of the series of waypoints between the termination waypoint and the start waypoint when the flight height of the highest waypoint is not greater than the ground elevations of the series of waypoints between the termination waypoint and the start waypoint;
   obtain a ground elevation of the highest waypoint; and
   determine a sum of a difference between the highest ground elevation and the ground elevation of the highest waypoint and a preset threshold as the flight height of the intermediate flight route.

13. The flight route splicing system according to claim 12, wherein the ground elevation of the highest waypoint is a difference between an elevation of the highest waypoint and the flight height of the highest waypoint.

14. The flight route splicing system according to claim 10, wherein the processor is further configured to:
   determine a start waypoint of the intermediate flight route, wherein geographic location information of the start waypoint of the intermediate flight route is the same as the first geographic location information;
   determine a termination waypoint of the intermediate flight route, wherein geographic location information of the termination waypoint of the intermediate flight route is the same as the second geographic location information; and
   generate the intermediate flight route according to the start waypoint of the intermediate flight route, the termination waypoint of the intermediate flight route, and the flight height of the intermediate flight route.

15. The flight route splicing system according to claim 10, wherein the first geographic location information comprises latitude and longitude information of the termination waypoint, and the second geographic location information comprises latitude and longitude information of the start waypoint.

16. The flight route splicing system according to claim 10, further comprising:
   a display module, configured to display the spliced flight route to a user.

17. The flight route splicing system according to claim 10, wherein the processor is further configured to:
   calculate estimated flight durations of the first flight route and the second flight route, separately;
   determine whether a sum of the estimated flight durations of the first flight route and the second flight route is greater than a preset flight duration of the unmanned aerial vehicle; and
   send, to the user, prompt information that the flight distance or the flight duration of the unmanned aerial vehicle is excessively long and the user needs to confirm whether to continue splicing when the sum of the sum of the estimated flight durations of the first flight route and the second flight route and the shortest flight duration is greater than the preset flight duration of the unmanned aerial vehicle.

18. The flight route splicing system according to claim 17, wherein the processor is further configured to:
   calculate a shortest flight duration for the unmanned aerial vehicle to fly from the termination waypoint of the first flight route to the start waypoint of the second flight route at a maximum flight speed when the sum of the estimated flight durations of the first flight route and the second flight route is not greater than the preset flight duration of the unmanned aerial vehicle;
   determine whether a sum of the sum of the estimated flight durations of the first flight route and the second flight route and the shortest flight duration is greater than the preset flight duration of the unmanned aerial vehicle; and
   send, to the user, prompt information that the flight distance or flight duration of the unmanned aerial vehicle is excessively long and the user needs to confirm whether to continue splicing when the sum of the sum of the estimated flight durations of the first flight route and the second flight route and the shortest flight duration is greater than the preset flight duration of the unmanned aerial vehicle.

19. A user terminal, in communication connection with an unmanned aerial vehicle, and comprising a body, a display screen disposed in the body, and a controller disposed in the body, wherein the controller is configured to:
   obtain a first flight route and a second flight route of an unmanned aerial vehicle;
   obtain a flight height of a highest waypoint having a greatest flight height in the first flight route and the second flight route and ground elevations of a series of waypoints between a termination waypoint of the first flight route and a start waypoint of the second flight route;
   obtain a flight height of an intermediate flight route according to the flight height of the highest waypoint and the ground elevations of the series of waypoints between the termination waypoint and the start waypoint, wherein the intermediate flight route is used for connecting the first flight route and the second flight route and is located between the first flight route and the second flight route;
   determine the intermediate flight route according to first geographic location information of the termination waypoint, second geographic location information of the start waypoint, and the flight height of the intermediate flight route; and
   splice the first flight route and the second flight route according to the intermediate flight route to generate a spliced flight route.

20. The user terminal according to claim 19, wherein the controller being further configured to obtain a flight height of an intermediate flight route according to the flight height of the highest waypoint and the ground elevations of the series of waypoints between the termination waypoint and the start waypoint comprises:
   determining whether the flight height of the highest waypoint is greater than the ground elevations of the series of waypoints between the termination waypoint and the start waypoint; and
   determining the flight height of the highest waypoint as the flight height of the intermediate flight route when the flight height of the highest waypoint is greater than the ground elevations of the series of waypoints between the termination waypoint and the start waypoint.

21. The user terminal according to claim 20, wherein the controller is further configured to:
  obtain a highest ground elevation among the ground elevations of the series of waypoints between the termination waypoint and the start waypoint when the flight height of the highest waypoint is not greater than the ground elevations of the series of waypoints between the termination waypoint and the start waypoint;
  obtain a ground elevation of the highest waypoint; and
  determine a sum of a difference between the highest ground elevation and the ground elevation of the highest waypoint and a preset threshold as the flight height of the intermediate flight route.

22. The user terminal according to claim 21, wherein the ground elevation of the highest waypoint is a difference between an elevation of the highest waypoint and the flight height of the highest waypoint.

23. The user terminal according to claim 20, wherein the controller being further configured to determine the intermediate flight route according to first geographic location information of the termination waypoint, second geographic location information of the start waypoint, and the flight height of the intermediate flight route comprises:
  determining a start waypoint of the intermediate flight route, wherein geographic location information of the start waypoint of the intermediate flight route is the same as the first geographic location information;
  determining a termination waypoint of the intermediate flight route, wherein geographic location information of the termination waypoint of the intermediate flight route is the same as the second geographic location information; and
  generating the intermediate flight route according to the start waypoint of the intermediate flight route, the termination waypoint of the intermediate flight route, and the flight height of the intermediate flight route.

24. The user terminal according to claim 19, wherein the first geographic location information comprises latitude and longitude information of the termination waypoint and the second geographic location information comprises latitude and longitude information of the start waypoint.

25. The user terminal according to claim 21, wherein the controller is configured to control the display screen to display the spliced flight route to a user.

26. The user terminal according to claim 19, wherein the controller is further configured to:
  calculat estimated flight durations of the first flight route and the second flight route, separately;
  determine whether a sum of the estimated flight durations of the first flight route and the second flight route is greater than a preset flight duration of the unmanned aerial vehicle; and
  send, through the display screen to the user, prompt information that a flight distance or flight duration of the unmanned aerial vehicle is excessively long and the user needs to confirm whether to continue splicing when the sum of the estimated flight durations of the first flight route and the second flight route is greater than the preset flight duration of the unmanned aerial vehicle.

27. The user terminal according to claim 26, wherein the controller is further configured to:
  calculat a shortest flight duration for the unmanned aerial vehicle to fly from the termination waypoint of the first flight route to the start waypoint of the second flight route at a maximum flight speed when the sum of the estimated flight durations of the first flight route and the second flight route is not greater than the preset flight duration of the unmanned aerial vehicle;
  determine whether a sum of the sum of the estimated flight durations of the first flight route and the second flight route and the shortest flight duration is greater than the preset flight duration of the unmanned aerial vehicle; and
  send, through the display screen to the user, prompt information showing that the flight distance of the unmanned aerial vehicle is excessively long and the user needs to confirm whether to continue splicing when the sum of the sum of estimated flight durations of the first flight route and the second flight route and the shortest flight duration is greater than the preset flight duration of the unmanned aerial vehicle.

* * * * *